(12) United States Patent
Hopkins

(10) Patent No.: US 10,635,111 B2
(45) Date of Patent: Apr. 28, 2020

(54) DYNAMIC POSITIONING OF MOBILE OFFSHORE DRILLING UNIT

(71) Applicant: Rowan Companies, Inc., Houston, TX (US)

(72) Inventor: Richard Hopkins, Houston, TX (US)

(73) Assignee: Rowan Companies, Inc., Houston, TX (US)

( * ) Notice: Subject to any disclaimer, the term of this patent is extended or adjusted under 35 U.S.C. 154(b) by 343 days.

(21) Appl. No.: 15/289,275

(22) Filed: Oct. 10, 2016

(65) Prior Publication Data

US 2018/0101174 A1 Apr. 12, 2018

(51) Int. Cl.
| | | |
|---|---|---|
| G05D 1/02 | (2020.01) | |
| G01C 21/16 | (2006.01) | |
| B63H 25/42 | (2006.01) | |
| B63H 25/04 | (2006.01) | |
| E21B 7/128 | (2006.01) | |

(52) U.S. Cl.
CPC ........... *G05D 1/0208* (2013.01); *B63H 25/42* (2013.01); *G01C 21/16* (2013.01); *G01C 21/165* (2013.01); *B63H 2025/045* (2013.01); *E21B 7/128* (2013.01)

(58) Field of Classification Search
None
See application file for complete search history.

(56) References Cited

U.S. PATENT DOCUMENTS

| | | | |
|---|---|---|---|
| 4,205,379 A | 5/1980 | Fox et al. | |
| 6,378,450 B1 | 4/2002 | Begnaud et al. | |
| 6,848,382 B1 | 2/2005 | Bekker | |
| 7,663,976 B2 | 2/2010 | Stephens | |
| 7,985,108 B1 | 7/2011 | Bekker et al. | |
| 8,028,638 B2 | 10/2011 | Olsen et al. | |

(Continued)

FOREIGN PATENT DOCUMENTS

| | | | | |
|---|---|---|---|---|
| EP | 2161542 A1 | * | 3/2010 | ............ B63H 25/04 |
| EP | 2161542 A1 | | 3/2010 | |

OTHER PUBLICATIONS

International Search Report and Written Opinion mailed in counterpart PCT application PCT/US2017/054925, dated Jan. 9, 2018.

(Continued)

*Primary Examiner* — Shelley Chen
(74) *Attorney, Agent, or Firm* — Fletcher Yoder, P.C.

(57) ABSTRACT

A system dynamically controls position of a mobile offshore drilling unit relative to a subsea operation, an offshore location, or the like. The system has navigation units, acoustic units, and inertial units. The navigation units obtain position from one or more satellite navigation systems, and the acoustic units obtains position from one or more acoustic positioning reference systems. The inertial units obtains position of the unit from one or more inertial navigation systems, and this inertial position for each unit is based at least in part on the positions obtained from respective ones of the navigation and acoustic units. A control unit in operable communication with the inertial units determines dynamic positioning information from the inertial position of at least one of the inertial units. In turn, the control unit then operates equipment on the drilling unit to control its position dynamically.

37 Claims, 3 Drawing Sheets

(56) References Cited

U.S. PATENT DOCUMENTS

| | | | |
|---|---|---|---|
| 8,479,673 B1 | 7/2013 | Ledder et al. | |
| 2005/0125141 A1* | 6/2005 | Bye | G01C 21/165 701/469 |
| 2008/0008031 A1* | 1/2008 | Vigen | G01V 1/3835 367/15 |
| 2008/0091351 A1* | 4/2008 | Hoshizaki | G01C 21/165 701/478.5 |
| 2010/0088030 A1* | 4/2010 | Stephens | B63H 25/04 701/500 |
| 2013/0185020 A1* | 7/2013 | Stephens | G01C 21/165 702/182 |
| 2013/0346017 A1 | 12/2013 | Stephens | |
| 2016/0290826 A1* | 10/2016 | Brenner | G05D 1/0077 |
| 2017/0013409 A1* | 1/2017 | Cerchio | G01C 25/005 |
| 2018/0238710 A1* | 8/2018 | Gregory | G01C 25/005 |

OTHER PUBLICATIONS

Nautronix, "Acoustic Positioning Systems," Presentation, dated Apr. 5, 2005, 69-pgs.
Kongsberg, "HAIN Reference: Hydrostatic Aided Inertial Navigation," Instruction Manual, copyright 2016, obtained from www.km.kongsberg.com on Sep. 6, 2016, 55-pgs.
Kongsberg, "MGC(R) R3," Brochure, dated Aug. 2014, 2-pgs.
Kongsberg, "MRU 5+ MK-II," Brochure, dated Mar. 2015, 2-pgs.
Verhoeven, H. et al., "Safety of Dynamic Positioning Operation on Mobile Offshore Drilling Units," Dynamic Positioning Conference, Sep. 28-30, 2004, 13-pgs.
Ge, s. et al., "Dynamic Positioning System for Marine Vessels," from the Impact of Control Technology, T. Samad and A.M. Annaswamy (eds.), 2011, 2-pgs.

\* cited by examiner

DYNAMIC POSITIONING OF MOBILE OFFSHORE DRILLING UNIT

FIELD OF THE DISCLOSURE

The subject matter of the present disclosure relates to using inertial measurement systems for dynamic positioning of a mobile offshore drilling unit aided by both a navigation satellite system and an acoustic positioning reference system.

BACKGROUND OF THE DISCLOSURE

A mobile offshore drilling unit (MODU) performs drilling of a subsea well while maintaining a position over the well during operations. The drilling unit can be a drillship, a semisubmersible, a jack-up, and other movable offshore facility. The drilling unit may include self-propulsion equipment and require dynamic positioning or mooring equipment to maintain its position.

For example, the drilling unit may use a dynamic positioning system to accurately maintain position over the well, which is vital during operations. The positioning system requires multiple position inputs in order to operate correctly and reliably. These positions inputs are supplied by multiple positioning reference systems, including Global Navigation Satellite Systems (GNSS) and multiple Acoustic Positioning Reference Systems that supply X, Y and Z position coordinates. Recently, vessels have begun to also use Inertial Navigation systems (INS) in addition to the traditional positioning reference systems.

As an example, a dynamic positioning system of the prior art uses INS systems that work in tandem with traditional positioning reference systems. As is known, the INS systems require position updates in order to maintain an accurate position calculation over a long period of time. Currently, operating these systems in tandem involves using one INS system with one navigation satellite system and using another INS system with an acoustic system to provide inertial positions as well as more accurate and reliable positions for the positioning reference systems. The robustness of the system may be boosted by using a number of standalone positioning reference systems, such as navigation satellite systems and acoustic systems. These standalone systems may not be as accurate or precise so the dynamic system may apply less significance to their inputs.

Although the dynamic system using INS systems as noted above may be useful, operators seek to mitigate the risk of position loss due to a failure in station-keeping equipment as the failure can lead to significant detrimental effects. For this reason, operators are constantly looking for any technology that will increase the reliability of their operation. The impact of this cannot be overstated. Accordingly, what is needed is a dynamic positioning system that utilizes Inertial Navigation technology for a reference system configuration that maximizes the robustness of position inputs. The subject matter of the present disclosure is directed to overcoming, or at least reducing the effects of, one or more of the problems set forth above.

SUMMARY OF THE DISCLOSURE

A system dynamically controls position of a mobile offshore drilling unit, vessel, or other floating unit relative to an offshore location, a subsea operation, or the like. The system has navigation units, acoustic units, and inertial units. The navigation units obtain first position information from one or more satellite navigation systems, and the acoustic units obtain second position information from one or more acoustic positioning reference systems. The inertial units obtain third position information of the unit from one or more inertial navigation systems. The third position information for each inertial unit is based at least in part on at least one of the first and second position information obtained from respective ones of the navigation and acoustic units. For example, the third position information of a given inertial unit may be aided by first information from a respective navigation unit as well as by second information from a respective acoustic unit. Alternatively, the third position information of a given inertial unit may be aided by first position information from at least two respective navigation units or by second position information from at least two respective acoustic units. A control unit in operable communication with the inertial units determines dynamic positioning information from the inertial position of at least one of the inertial units. In turn, the control unit then operates equipment on the drilling unit to control its position dynamically.

The foregoing summary is not intended to summarize each potential embodiment or every aspect of the present disclosure.

DETAILED DESCRIPTION OF THE DISCLOSURE

Figure 1:
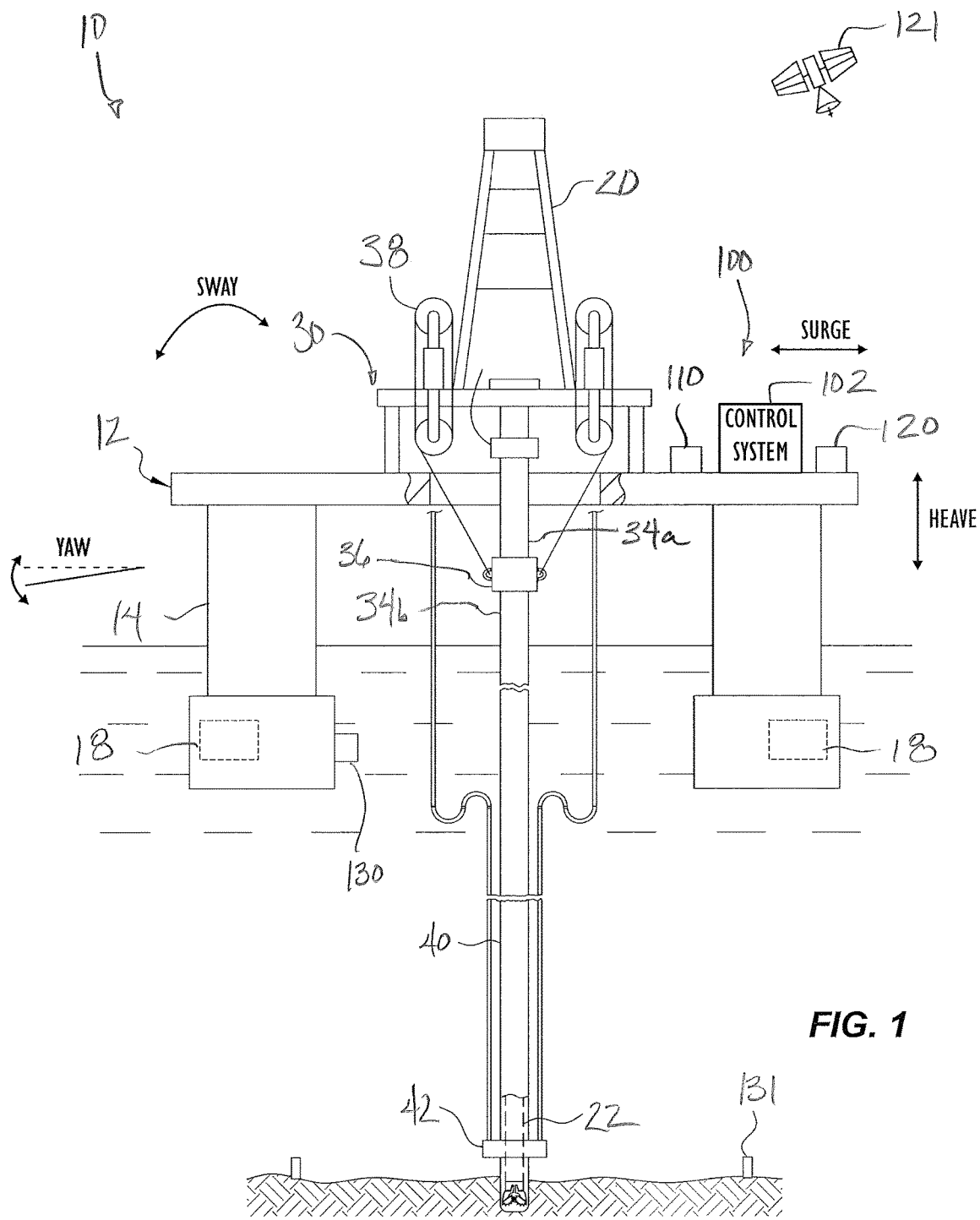
FIG. 1 illustrates a mobile offshore drilling unit having a dynamic positioning system according to the present disclosure.

As shown in FIG. 1, a mobile offshore drilling unit (MODU) 10 performs drilling of a subsea well while maintaining a position over the well during operations. The drilling unit 10 can be a drillship vessel, a semisubmersible, and other movable offshore facility. The exemplary drilling unit 10 includes a platform 12, hulls 14, a rig 20, conventional control and power systems, rotary tables, spiders, and/or other tubular handling equipment used to drill a well in the seafloor using a drill string 22 or the like. A riser 40 extends from the rig 20 to a subsea wellhead 42 to contain flow returns.

In general, the drilling unit 10 and the riser 40 allow for some movements, such as rising and lowering due to ocean heave, flexing with ocean currents, etc. using a tensioning system 30. For example, a diverter/flexible joint 32 to direct drilling fluids, wellbore fluids, and cuttings to equipment on the rig 20 may accommodate for some movements. Upper and lower telescopic joint sections 34a-b may compensate for the heave, raising and lowering, of the drilling unit 10 by the sea as known in the art. The telescopic joints sections 34a-b can be secured to the drilling unit 10 by a slip ring 36a, which includes one or more cables that are spooled to tensioners 36b disposed on the platform 12. The tensioners 36b are operable to maintain an upward pull on the riser 40 to prevent the riser 40 from buckling under its own weight. The tensioners 36b are also adjustable to allow adequate support for the riser 40.

In addition to heave, the drilling unit's position is subject to surge, sway, yaw, etc. from environmental forces. To counter these forces, the drilling unit 10 includes self-propulsion equipment 18 and uses dynamic positioning to maintain its position during operations. In particular, the drilling unit 10 is subject to winds, waves, and currents while performing the offshore operations and floating above the well. Changes in positions and movements of the drilling unit 10 at the water's surface can significantly impact the subsea operations. The unit 10, such as a drilling ship, may have self-propulsion equipment 18 in the form of a main propeller and rudder, an azimuth thruster, and a tunnel thruster to handle movement in surge, sway, and yaw caused by wind, waves, and current.

To handle the various movements, the drilling unit 10 uses a dynamic positioning system 100 to maintain the drilling unit 10 in position above the well. The dynamic system 100 operates the thrusters 18 positioned throughout the drilling unit 10 to maintain the unit's position in several directions. In particular, a control unit 102, which can be a computerized system of the dynamic positioning system 100, may determine control information and may then perform various steps for operational control, such as operating the various thrusters 18 automatically as needed to maintain the drilling unit's position. In addition or in the alternative, the control unit 102 may determine control information, generate alerts and the like, and provide the details to an operator, who then takes the various operational steps for position control. To provide control information, the control unit 102 receives position information of the drilling unit 10 from various positioning reference systems, including Inertial navigation units (INS) 110, navigation satellite units (NSS) 120, and acoustic positioning reference (ACS) units 130.

For example, the acoustic positioning reference units 130 include acoustic transmitters 131 on the sea floor or the like that provide acoustic signals for detection by receivers on the drilling unit 10. Additionally, the navigation satellite units 120 have receivers that obtain position and timing information from system satellites 121. The most common type used is a Global Positioning System (GPS). Furthermore, the inertial navigation units 110 obtain position information using internal sensors (i.e., gyroscopes, accelerometers, etc.) and components for tracking inertial movements of the drilling unit 10. Using all of the position information from these sources, the control unit 102 then automatically actuates the various thrusters 18 to accommodate for changes in the drilling unit's position caused by the environmental conditions and forces. In addition to or as an alternative to thrusters 18, this dynamic positioning can also be used with a mooring system (not shown) to help maintain position.

As can be seen, the dynamic positioning system 100 maintains the position of the mobile offshore drilling unit 10 during operations. Accordingly, the dynamic positioning system 100 is preferably built for reliability with special consideration for redundancy so that one single point of failure will not hinder the system's capability to maintain position.

Figure 2A:
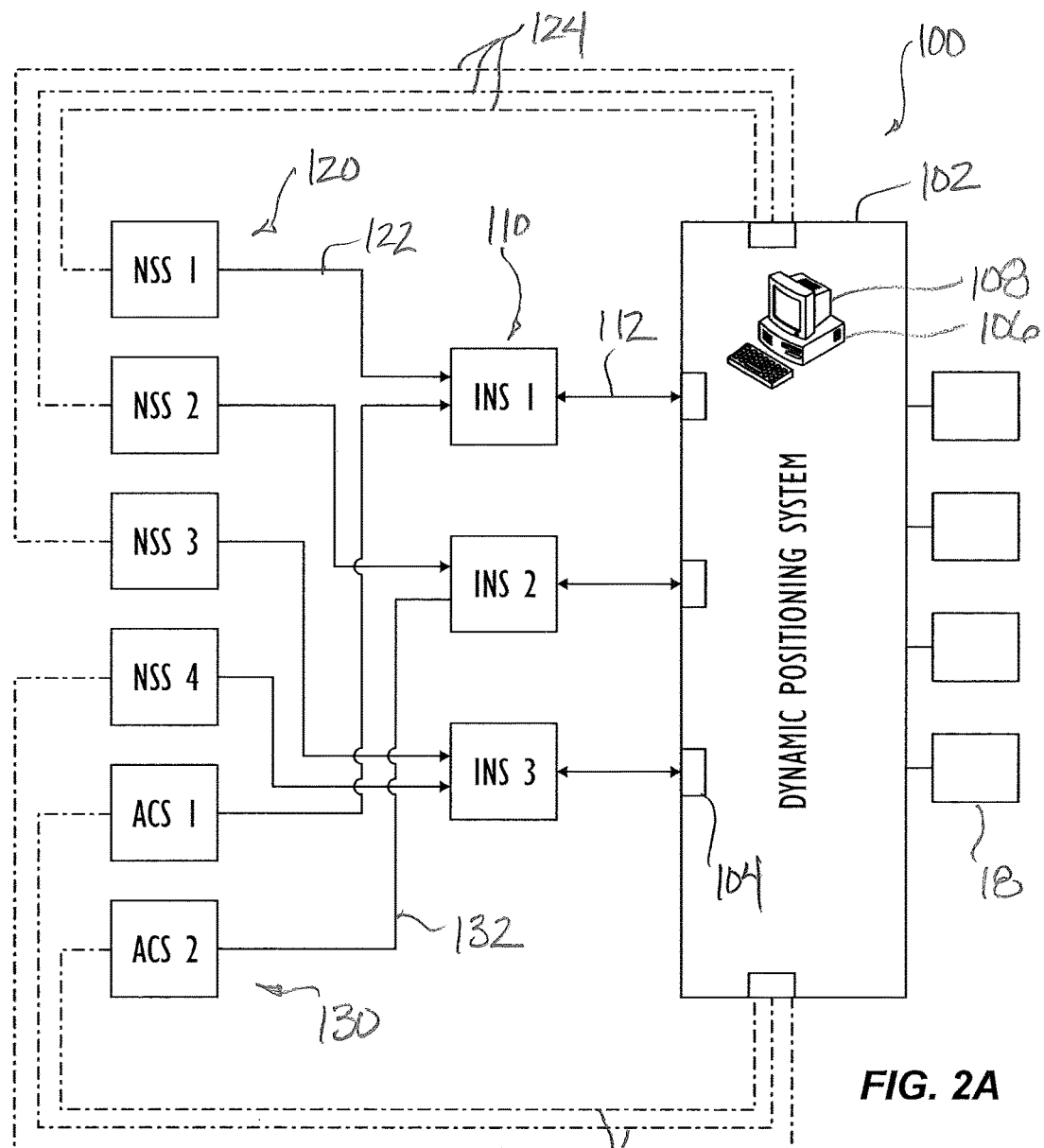
FIG. 2A illustrates an example configuration of the dynamic positioning system according to the present disclosure.

Turning to FIG. 2A, an example configuration of a dynamic positioning system 100 according to the present disclosure is configured for reliability with special consideration for redundancy. As noted, the system 100 dynamically controls position of a floating unit or vessel (e.g., 10: FIG. 2) relative to a subsea operation. To do this, the system 100 includes a plurality of inertial units 110, a plurality of navigation units 120, a plurality of acoustic units 130, and a control unit 102.

The navigation units 120 obtain first position information 122 of the floating unit (10) from one or more navigation satellite systems, such as GPS. The acoustic units 130 obtain second position information 132 of the floating unit (10) from one or more acoustic positioning reference systems. Finally, the inertial units 110 obtain third position information 112 of the floating unit (10) from one or more inertial navigation systems. The third position information 112 from each unit 110 is based at least in part on (e.g., aided or corrected by) the first and second position information 122, 132 obtained with respective ones of the other units 120, 130.

Finally, the control unit 102 in operable communication with the inertial units 110 determines dynamic positioning information from the position information 112 of at least one of these inertial units 110. Based on the determined position, the control unit 102 then operates the floating unit's thrusters 18 or other positioning equipment to adjust the unit's positions. At the same time, each of the navigation satellite units 120 and acoustic units 130 communicate position information 124, 134 to the control unit 102 for monitoring purposes and for use during failure or the like, as discussed below.

The control unit 102 has several input/output modules 104 for data communication and has a computer, a programmable logic controller, or other processing unit 106 to process the data gathered and sent by these I/O modules 104. A user interface 108 at an operator station allows operators to control and monitor the system 10, the floating unit (10), and system components. Other conventional components including memory and the like are not shown for convenience. Overall, the position information supplied to the control unit 102 allows the unit 102 to be aware of where the floating unit (10) is in real-time or at least near real-time.

As shown in FIG. 2A, the system 100 includes at least three inertial navigation system (INS) units 110 using inertial navigation to provide position information 112 for use by the dynamic system 100. As will be appreciated, an inertial navigation system is a form of position referencing system that works by sensing its own movement. These three inertial units 110 are aided by and provide aid to each of at least two positioning reference units 120, 130. In this way, the position information for each inertial unit 110 is based at least in part on at least one of the position information obtained from respective ones of the navigation and acoustic units 120, 130. Accordingly, the position information of a given inertial unit 110 may be aided by position information from a respective navigation unit 120 as well as by position information from a respective acoustic unit 130. Alternatively, the position information of a given inertial unit 110 may be aided by position information from at least two respective navigation units 120 or by position information from at least two respective acoustic units 130.

In the particular arrangement shown in FIG. 2A, a first (INS 1) inertial unit 110 is operatively connected to a first (NSS 1) navigation unit 120 and to a first (ACS 1) acoustic unit 130. A second (INS 2) inertial unit 110 is operatively connected to a second (NSS 2) navigation unit 120 and to a second (ACS 2) acoustic unit 130. Finally, a third (INS 3) inertial unit 110 is operatively connected to a third and a fourth (NSS 3 & 4) navigation unit 130. In turn, the three inertial units 110 are each operatively connected to the control unit 102, which can operate the various thrusters or positioning equipment 18. Having the third (INS 3) inertial unit 110 operatively connected to two navigation units 120 may have the benefit of offering comparative redundancy. However, the third (INS 3) inertial unit 110 can be similarly configured as the other units 110, or one of the other inertial units 110 may be configured similar to the third (INS 3) inertial unit 110. Further, the third (INS 3) inertial unit 110 may instead be operatively connected to two acoustic units 130. As will be appreciated, these and other configurations are possible.

In addition to this operational configuration, all six of the positioning systems' units 120, 130 are operatively connected to the control unit 102 in a monitoring arrangement so that their position information 124, 134 is constantly monitored by the control unit 102 and can be accepted as a full position input should its corresponding inertial unit 110 fail or for other reasons.

The configuration of operational and monitoring arrangements noted above is depicted in isolation in FIG. 2B for one of the inertial units 110 and its respective positioning reference units 120, 130. The arrangement increases the overall robustness of the dynamic positioning system 100 and increases its reliability. Yet, the amount of hardware required to implement the dynamic system 100 is reduced over current configurations. This leads to simplification of cabling, reductions in costs, and other benefits.

In general, each of the inertial units 110 of FIG. 3A can use components of an inertial navigation system known in the art, such as a processor, accelerometers, and gyroscopes. The inertial units 110 use dead reckoning techniques to determine position, orientation, direction, and speed of the drilling vessel (10) continuously. Adjustments proactively made to the vessel's position can be fed back to the inertial units 110. Depending on how long the vessel (10) is dead reckoned in this way, the drift error inherent to the units' measurements of acceleration, velocities, displacements, etc. may become increasingly magnified. Accordingly, the inertial navigation is preferably corrected by periodic position reference readings from the other respective units 120, 130. The inertial units 110 can also give a prediction on where the next position will be based on the unit's current position relative to new forces expected. For redundancy or diversity as desired, the equipment of the system used for each of the three inertial units 110 may be the same or different from one another, and the inertial measuring techniques and data of the system used by each of the three inertial units 110 may be the same or different from one another.

For its part, each of the navigation units 120 of FIG. 2A can use a navigation satellite system that has satellites to offer global coverage and to provide positioning and timing data to receivers. Example systems include the United States' Global Position System (GPS), the Russian Federations Global Orbiting Navigation Satellite System (GLONASS), and the European Global Navigation Satellite System (Galileo). Accordingly, the navigation units 120 can use Global Positioning System (GPS) receivers to obtain GPS readings (i.e., position and timing data) from system satellites for determining position and timing information of the vessel (10). For redundancy or diversity as desired, the equipment of the system used for each of the navigation units 120 may be the same or different from one another, and the measuring techniques and data of the system used by each of the navigation units 110 may be the same or different from one another.

Finally, each of the acoustic units 130 of FIG. 3A can use acoustic signals for signaling in the ocean water and determining relative positions between underwater locations. Long baseline, short baseline, and ultra-short baseline are three acoustical techniques for calculating positions between receivers (i.e., hydrophones) and transmitters or beacons in the water. Various acoustical bandwidths can be used to determine desired ranges of accuracy and the like. For redundancy or diversity as desired, the equipment of the system used for each of the acoustic units 130 may be the same or different from one another, and the measuring techniques and data of the system used by each of the acoustic units 130 may be the same or different from one another.

As will be appreciated, various forms of equipment can be used for the positioning reference units 110, 120, and 130. As brief examples, motion reference units, such as the MRU5+ or MGC R3 from Kongsberg Maritime, can be used and have solid-state gyroscopes and accelerometers. A Hydroacoustic Aided Inertial Navigation (HAIN) system available from Kongsberg Maritime can be used for dynamic positioning. Different equipment can be used for each of the units of the same type to provide additional robustness to the system 100.

Feeding at least two position inputs from the positioning reference units 120, 130 into one inertial unit 110 can involve selecting the input of one of the units 120, 130 over the other, weighting both inputs with adjustable and proportional weights, or reconciling the input of one unit 120, 130 with the input of the other. For example, the position inputs from the positioning reference units 120, 130 fed into the inertial unit 110 can be weighted and may be handled in different ways. The weighting can involve proportional weights given to one or more readings, coordinates, vectors, or other such parameters of the position information involved. As will be appreciated, the weighting used can use any of a number of numerical techniques, including percentages, ratios, statistics, and other algorithms for numerical analysis, which can be selected for a given implementation.

As for handling, both position inputs from the two positioning units 120, 130 can be used simultaneously to aid the inertial unit 110 with the proportional weighting of the parameters. Alternatively, the position inputs from one of the positioning reference units 120, 130 may be used for a given period as long as the quality of the input's parameters remains above certain limits, at which point position input could be used from the other positioning unit 120, 130.

In particular, it may be assumed that the acoustic units 130 may be less accurate than the navigation units 120 so that inputs from the acoustic units 130 may be given less weight or handled differently. As such, the inertial unit 110 may more heavily weight the position inputs from the navigation unit 120. Yet, this may not be always true because both the navigation unit 120 and the acoustic unit 130 are more accurate than each other in different ways. In operation, the standard deviation from the acoustic unit 130 tends to provide a larger circumference of 'grouping' for readings than the navigation unit 120. Therefore, when the acoustic unit 130 receives readings outside that grouping, the input from the acoustic unit 130 can easily be disregarded as an outlier. By contrast, the navigation unit 120 tends to have a wander in signaling that is followed by a grouping of readings at a new location, which makes the navigation unit's operation appear trustworthy when it may actually not be. Accordingly, using both the navigation unit 120 and the acoustic unit 130 comparatively to aid the inertial unit 110 makes for a robust configuration due to these and other differences in the characteristics of the navigation and acoustic units 120, 130.

Weighting of the position units' inputs into the inertial units 110 can be handled by each inertial unit 110. In turn, the control unit 102 handles final weighting responsibilities. In particular, the control unit 102 may weigh the three inertial units' inputs as normal while monitoring the six position units' inputs. Individual inputs 124, 134 from the positioning reference units 120, 130 to the control unit 102 may then only be required upon failure of one or more of the inertial units 110. In the end, the dynamic system 100 can make a quality assessment of the position information based on the monitored inputs from each positioning reference unit 110, 120, and 130. For instance, the dynamic system 100 may determine when and if a given inertial unit's input into the system 100 should be ignored or disregarded. For example, the given inertial unit's output may be disregarded as system input if one of inertial unit's inputs from one of the positioning reference units 120, 130 is erroneous or missing. Likewise, if the input from one of the positioning reference units 120, 130 as monitored at the controller 102 shows the unit 120, 130 to be offline, the controller 102 can send a signal to the respective inertial unit 110 with that information so the inertial unit 110 ignores any input from the offline unit 120, 130 until it comes back online. As will be appreciated, a number of algorithms can be applied to the various inputs and outputs of the units 110, 120, and 130 to weigh, average, ignore, correct, and handle them.

Figure 2B:
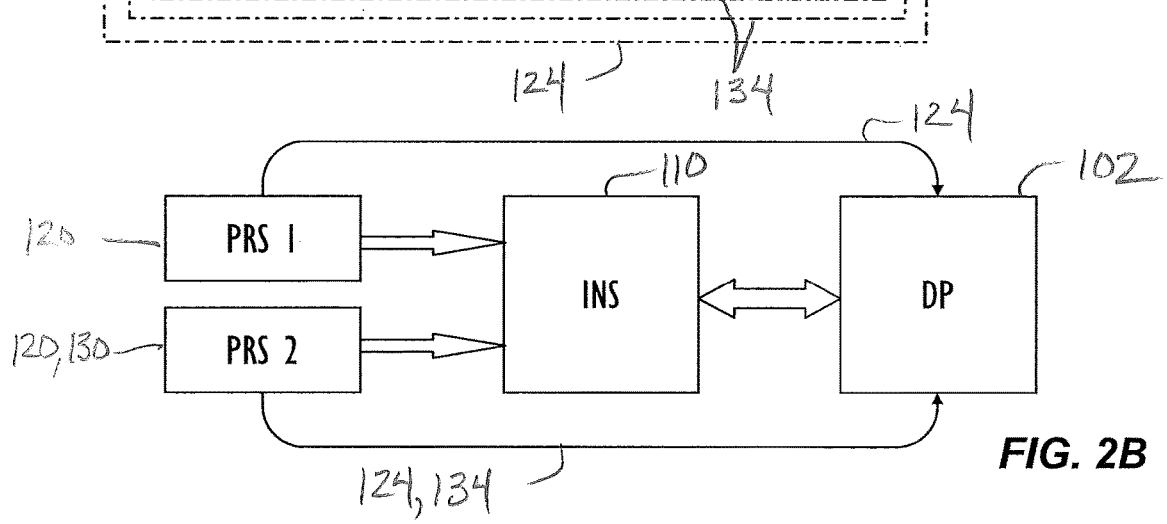
FIG. 2B illustrates a simplified depiction of the communication arrangement for one of the inertial units in the disclosed positioning system.
Figure 3:
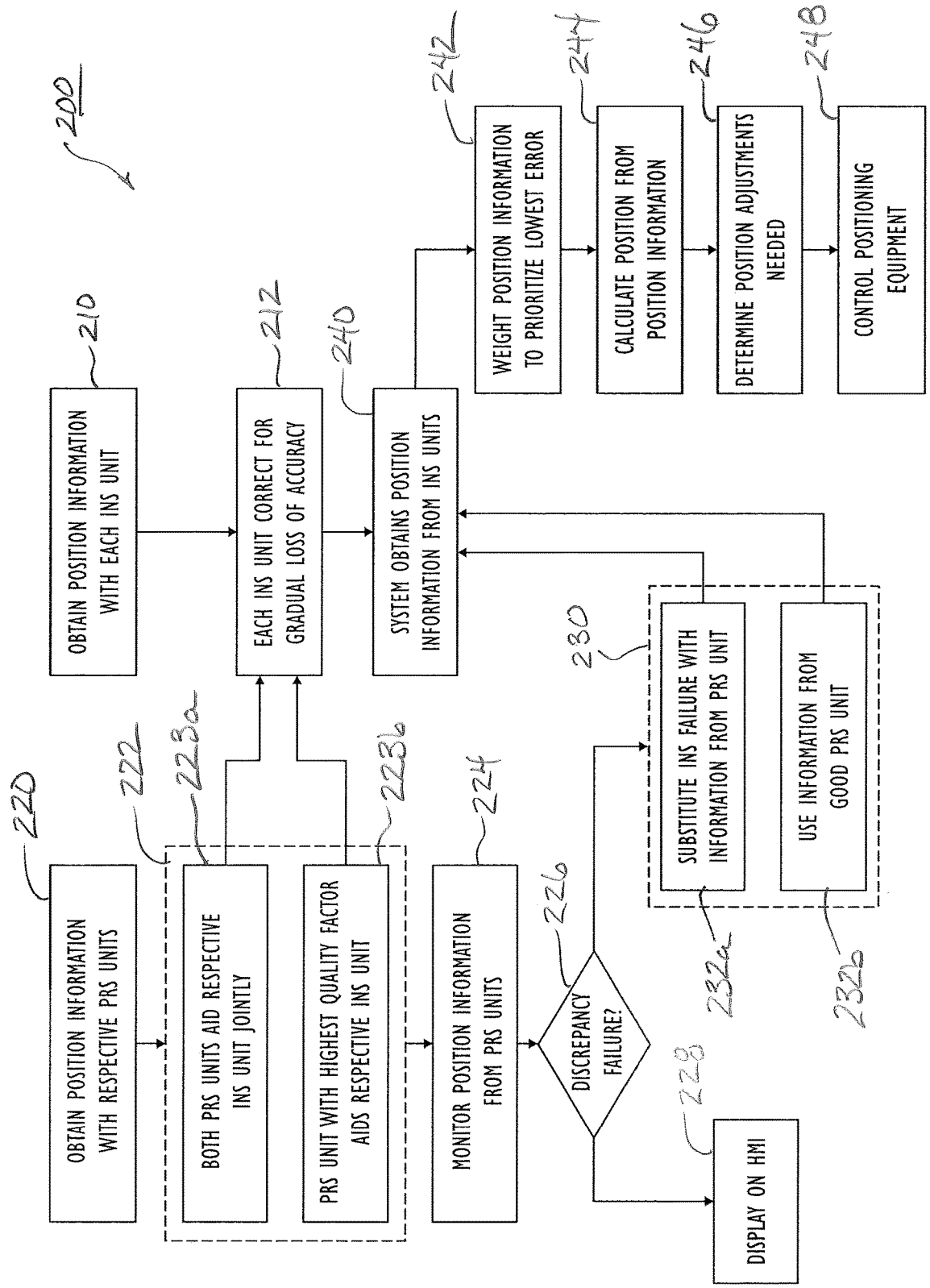
FIG. 3 illustrates a flow chart of a dynamic positioning process according to the present disclosure.

Having an understanding of the dynamic positioning system 100, discussion now turns to FIG. 3, which illustrates a flow chart of a dynamic positioning process according to the present disclosure. References to components in FIGS. 1 and 2A-2B are made concurrently for understanding.

During normal operation, the dynamic positioning system 100 uses the inertial navigation system (INS) units 110 connected to the control unit 102 as the primary positioning reference systems (PRS), and weighting is carried out to prioritize the position information with the lowest error value. Accordingly, normal operation involves each inertial unit 110 obtaining position information (Block 210) and involves each positioning reference system unit 120, 130 obtaining position information (Block 220).

As noted, each inertial unit 110 is fed by two different positioning reference units 120, 130, which are used to aid the inertial unit 110. There are two methods that can be used to do this (Block 222). In particular, both positioning reference units 120, 130 can be used at the same time to jointly contribute to aiding the inertial unit 110 (Block 223a), or the positioning reference units 120, 130 with the highest quality factor can be used (Block 223b). In turn, each inertial unit 110 uses the aid from its respective positioning reference units 120, 130 to correct for the gradual loss of accurate position typical of INS performance (Block 212).

Furthermore, there is an additional feed from all of the positioning reference units 120, 130 (i.e., two per inertial unit 110) directly into the control unit 102 (Block 224). During normal operation without discrepancy or failure (Decision 226), these additional feeds are used for monitoring purposes. In particular, the control unit 102 assesses the accuracy of the information and displays it on the Human Machine Interface (HMI) (Block 228), but the monitored position information is not used for final position calculations.

Returning to the position determinations, once each inertial unit 110 corrects for gradual loss of accuracy (Block 212), the control unit 102 obtains the position information from the inertial units 110 (Block 240). During normal operations, the control unit 102 weights the position information from the inertial units 110 to promote the lowest error (Block 242) and calculates current position in real-time (or at least near real-time) from the weighted position information (Block 244). The control unit 102 then determines what position adjustments or controls are needed to maintain the current operations at the correct position (Block 246). Finally, the control unit 102 then controls the positioning equipment 18 with the requisite adjustments (Block 248).

At times, a discrepancy or failure in the position gathering and operation of the units 110, 120, and 130 may occur (Decision 226). In this instance, the control unit 102 operates in a failure mode to handle the discrepancy or failure (Block 230). Failure can occur if a given inertial unit 110 fails to provide sufficient position information or its position information is determined erroneous as compared to the monitored position information 124, 134 from its respective positioning reference units 120, 130.

First, a direct failure of an inertial unit 110 is treated as standard positioning reference failure by the control unit 110. In this instance, the position information 124, 134 from the positioning reference units 120, 130 connected to the faulty inertial unit 110 are available for use, and the control unit 102 uses one or both of the position information 124, 134 directly as a substitute or replacement, rather than just for monitoring (Block 232a). In this way, the control unit 102 at Block 240 obtains the position information from the properly operating inertial units 110 and any of the substitute units 120, 130, if necessary.

In a second form of failure, the inertial unit 110 may provide faulty position information because one of its respective positioning reference units 120, 130 has failed. Treatment of a failure of a respective positioning reference unit 120, 130 depends on which aiding method is used (see Block 222). For instance, the aiding may continue from the redundant positioning reference unit 120, 130 operating without failure (Block 232b) so (i) the control unit 102 uses the position information 124, 134 directly as a substitute or replacement of the inertial unit' information rather than just for monitoring or (ii) the inertial unit 110 uses only the position information from the good unit 120, 130 in its correction. In this way, the control unit 102 at Block 240 obtains the position information from the properly operating inertial units 110 and any of the substitute units 120, 130, if necessary.

Various acronyms and names for components have been used in the present disclosure and may be different than conventionally used for such components. It should be appreciated that these acronyms and names have been used herein for the sake of simplicity and explanation and should not be confused with terms for other types of equipment onboard a MODU. Throughout the disclosure, various components have been references as being "first," "second," and "third." This is done merely to differentiate the various components from one another and not to imply any order of priority or sequence of operation. Finally, specific embodiments in the present disclosure have been directed to controlling position of a floating unit relative to a subsea operation. It will be appreciated that the teachings of the present disclosure can apply to dynamic positioning of any floating unit or vessel relative to an offshore location regardless of any operations.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A system for dynamically controlling position of a floating unit relative to an offshore location, the system comprising:
 a plurality of navigation units obtaining first position information of the floating unit using one or more satellite navigation systems;
 a plurality of acoustic units obtaining second position information of the floating unit using one or more acoustic positioning reference systems;
 a plurality of inertial units obtaining third position information of the floating unit using one or more inertial navigation systems, the third position information for each of at least first and second of the inertial units being based on both of the first and second position information obtained from respective ones of the navigation and acoustic units; and
 a control unit in operable communication with the inertial units and determining dynamic positioning information from the third position information of at least one of the inertial units and determining whether to disregard the third position information for each of at least the first and the second of the inertial units.

2. The system of claim 1, wherein the first of the inertial units receives the first position information from a first respective one of the navigation units and receives the second position information from a first respective one of the acoustic units; and wherein the second of the inertial units receives the first position information from a second respective one of the navigation units and receives the second position information from a second respective one of the acoustic units.

3. The system of claim 2, wherein the first of the navigation units obtains the first position information using a first of the one or more satellite navigation systems different than a second of the one or more satellite navigation systems used for obtaining the first position information of the second of the navigation units.

4. The system of claim 2, wherein the first of the acoustic units obtains the second position information using a first of the one or more acoustic positioning reference systems different than a second of the one or more acoustic positioning reference systems used for obtaining the second position information of the second of the acoustic units.

5. The system of claim 1, wherein the third position information for a third of the inertial units is based on the first position information from respective ones of at least two of the navigation units in absence of the second position information.

6. The system of claim 5, wherein the third of the navigation units obtains the first position information using a first of the one or more satellite navigation systems different than a second of the one or more satellite navigation systems.

7. The system of claim 1, wherein each of inertial units tracks the third position information from a different one of the one or more inertial navigation systems.

8. The system of claim 1, wherein each navigation unit comprises one or more receivers to obtain position and timing data.

9. The system of claim 1, wherein each acoustic unit comprises one or more acoustic receivers and one or more acoustic transmitters.

10. The system of claim 1, wherein each inertial unit comprises one or more gyroscopes and one or more accelerometers.

11. The system of claim 1, wherein the at least first and second of the inertial units each weights the first position information from the respective navigation unit at a first weight, weights the second position information from the respective acoustic unit at a second weight, and provides the third position information based in part on the first and second weighted position information.

12. The system of claim 1, wherein the at least first and second of the inertial units each uses the first position information from the respective navigation unit under a predetermined condition and uses the second position information from the respective acoustic unit otherwise.

13. The system of claim 1, further comprising positioning equipment operably controlled by the control unit, whereby the control unit positions the floating unit based on the dynamic positioning information determined.

14. The system of claim 1, wherein the control unit monitors the first position information from the navigation units and the second position information from the acoustic units.

15. The system of claim 14, wherein the control unit overrides the third position information provided by a respective one of the inertial units in response to a discrepancy between the third position information and at least one of the respective first and second position information.

16. The system of claim 14, wherein a respective one of the inertial units exhibits a failure, and wherein the control unit, in response to the failure, uses at least one of the respective first and second position information in place of the third position information from the respective inertial unit in the dynamic positioning determination.

17. The system of claim 1, wherein to determine the dynamic positioning information from the third position information of at least one of the inertial units, the control unit compares the third position information from each of the inertial units and selects the third position information indicative of a lowest error.

18. A floating unit used at an offshore location, comprising:
 positioning equipment operable to position the floating unit relative to the offshore location; and
 a dynamic positioning system operably controlling the positioning equipment, the system comprising a plurality of navigation units, a plurality of acoustic units, a plurality of inertial units, and a control unit according to claim 1.

19. A method of dynamically controlling position of a floating unit relative to an offshore location, the method comprising:
 obtaining first position information of the floating unit using a plurality of navigation units from one or more satellite navigation systems;
 obtaining second position information of the floating unit using a plurality of acoustic units from one or more acoustic positioning reference systems;
 obtaining third position information of the floating unit using a plurality of inertial units from one or more inertial navigation systems, the third position information for each of at least first and second of the inertial units being based on both of the first and second position information obtained from respective ones of the navigation and acoustic units;

determining dynamic positioning information from third position information obtained; and determining whether to disregard the third position information for each of at least the first and the second of the inertial units.

20. The method of claim 19, wherein obtaining the third position information comprises: obtaining the third position information at the first of the inertial units by using the first position information from a first respective one of the navigation units and using the second position information from a first respective one of the acoustic units; and obtaining the third position information at the second of the inertial units by using the first position information from a second respective one of the navigation units and using the second position information from a second respective one of the acoustic units.

21. The method of claim 20, wherein the first position information of the first of the navigation units is obtained from a first of the one or more satellite navigation systems different than a second of the one or more satellite navigation systems that obtains the first position information of the second of the navigation units.

22. The method of claim 20, wherein the second position information of the first of the acoustic units is obtained from a first of the one or more acoustic positioning reference systems different than a second of the one or more positioning reference systems that obtains the second position information of the second of the acoustic units.

23. The method of claim 19, wherein obtaining the third position information comprises obtaining the third position information at least a third of the inertial units by using the first position information from at least two of the navigation units in absence of using the second position information.

24. The method of claim 23, wherein the first position information of the third of the navigation units is obtained from a first of the one or more satellite navigation systems different than a second of the one or more satellite navigation systems.

25. The method of claim 19, further comprising tracking the third position information of each of inertial units from a different one of the one or more inertial navigation systems.

26. The method of claim 19, wherein obtaining the first position information using a given one of the navigation units comprises obtaining position and timing data from one or more receivers.

27. The method of claim 19, wherein obtaining the second position information using a given one of acoustic units comprises using one or more acoustic receivers and one or more acoustic transmitters.

28. The method of claim 19, wherein obtaining the third position information using a given one of inertial units comprises using one or more gyroscopes and one or more accelerometers.

29. The method of claim 19, wherein obtaining the third position information using each of the at least first and second of the inertial units comprises weighting the first position information from the respective navigation unit at a first weight, weighting the second position information from the respective acoustic unit at a second weight, and providing the third position information based on the first and second weighted position information.

30. The method of claim 19, wherein obtaining the third position information at each of the at least first and second of the inertial units comprises: using the first position information from the respective navigation unit under a predetermined condition; and using the second position information from the respective acoustic unit otherwise.

31. The method of claim 19, further comprising positioning the floating unit based on the dynamic positioning information determined.

32. The method of claim 19, further comprising monitoring the first position information from the navigation units and the second position information from the acoustic units.

33. The method of claim 32, further comprising overriding the third position information provided by a respective one of the inertial units in response to a discrepancy between the third position information and at least one of the respective first and second position information.

34. The method of claim 32, further comprising: determining a failure of a respective one of the inertial units; and using at least one of the respective first and second position information in place of the third position information from the respective inertial unit in the dynamic positioning determination.

35. The method of claim 19, wherein determining the dynamic positioning information from at least one of the inertial positions comprises: comparing the third position information from each of the inertial units; and selecting the third position information indicative of a lowest error.

36. The method of claim 23, wherein the at least two navigation units used for the third of the inertial units comprise respective ones of the navigation units different from the respective ones of the navigation units used for the at least first and second of the inertial units.

37. The system of claim 5, wherein the at least two navigation units used for the third of the inertial units comprise respective ones of the navigation units different from the respective ones of the navigation units used for the at least first and second of the inertial units.

* * * * *